United States Patent
Kita

(10) Patent No.: US 9,555,845 B2
(45) Date of Patent: Jan. 31, 2017

(54) ROLLER DEVICE FOR TRACK-TYPE WORK VEHICLE

(71) Applicant: KOMATSU LTD., Tokyo (JP)

(72) Inventor: Naoaki Kita, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/378,495

(22) PCT Filed: Nov. 8, 2013

(86) PCT No.: PCT/JP2013/080228
§ 371 (c)(1),
(2) Date: Aug. 13, 2014

(87) PCT Pub. No.: WO2014/112184
PCT Pub. Date: Jul. 24, 2014

(65) Prior Publication Data
US 2015/0008729 A1 Jan. 8, 2015

(30) Foreign Application Priority Data
Jan. 17, 2013 (JP) ................................ 2013-006242

(51) Int. Cl.
*B60B 9/00* (2006.01)
*B62D 55/14* (2006.01)
*B62D 55/15* (2006.01)
*F16C 33/72* (2006.01)

(52) U.S. Cl.
CPC .............. *B62D 55/14* (2013.01); *B62D 55/15* (2013.01); *F16C 33/72* (2013.01)

(58) Field of Classification Search
CPC ....... B62D 55/14; B62D 55/092; B62D 55/15; B62D 55/0966; B62D 55/10; B60B 9/00
USPC .......................... 305/136, 100, 130, 129, 137
See application file for complete search history.

(56) References Cited

U.S. PATENT DOCUMENTS

| 2,915,326 A | * | 12/1959 | Mason ................... F16C 33/74 305/119 |
| 3,147,048 A | * | 9/1964 | Johnson ............ B62D 55/0966 305/136 |
| 3,797,895 A | * | 3/1974 | Tomizawa ......... B62D 55/0966 305/136 |

(Continued)

FOREIGN PATENT DOCUMENTS

| CN | 1177552 A | 4/1998 |
| CN | 102481959 A | 5/2012 |

(Continued)

*Primary Examiner* — Hau Phan
(74) *Attorney, Agent, or Firm* — Drinker Biddle & Reath LLP

(57) ABSTRACT

A roller device includes a shaft, a bushing, a roller shell, a retainer, and a seal. The roller shell is fitted over the outer circumference of the bushing. The retainer is fixed detachably to an end of the bushing, and fitted in an end of the roller shell on a radially outer side. The seal is disposed on the outer circumference of the shaft so as to seal a gap between the shaft and the bushing. The seal includes a first seal member attached to the bushing and a second seal member attached to the shaft. The first seal member is rotatable relative to the second seal member. The second seal member has an outer circumferential end disposed on an inner side with respect to an inner circumferential end of the retainer.

4 Claims, 5 Drawing Sheets

(56) References Cited

U.S. PATENT DOCUMENTS

| | | | |
|---|---|---|---|
| 3,869,931 A | 3/1975 | Boggs | |
| 3,871,719 A * | 3/1975 | Boggs | B62D 55/15 305/136 |
| 3,910,128 A * | 10/1975 | Boggs | B62D 55/15 305/100 |
| 3,917,362 A * | 11/1975 | Stedman | B62D 55/15 184/105.1 |
| 4,149,758 A * | 4/1979 | Livesay | B62D 55/0887 305/100 |
| 5,288,143 A * | 2/1994 | Dester | B62D 55/145 305/137 |
| 6,074,023 A | 6/2000 | Satou et al. | |
| 6,474,754 B1 * | 11/2002 | Hasselbusch | B62D 55/10 305/136 |
| 7,108,337 B2 * | 9/2006 | Yamamoto | B62D 55/15 305/129 |
| 7,237,853 B2 * | 7/2007 | Yamamoto | B62D 55/15 305/130 |
| 8,075,068 B2 * | 12/2011 | VanderVeen | B62D 55/092 305/136 |
| 8,231,184 B2 * | 7/2012 | Mulligan | B62D 55/15 305/136 |
| 8,366,212 B2 * | 2/2013 | Maeda | B62D 55/14 305/136 |
| 8,979,219 B2 * | 3/2015 | Hisamatsu | B62D 55/14 305/100 |

FOREIGN PATENT DOCUMENTS

| | | |
|---|---|---|
| JP | S47-34837 U | 12/1972 |
| JP | S47-38349 U | 12/1972 |
| JP | S50-6101 Y1 | 2/1975 |
| JP | S50-12834 Y1 | 4/1975 |
| JP | S50-90026 A | 7/1975 |
| JP | S51-64328 U | 5/1976 |
| JP | S51-138829 U | 11/1976 |
| JP | S52-49445 U | 4/1977 |
| JP | S55-168486 U | 12/1980 |
| JP | H08-505338 A | 6/1996 |
| JP | H10-86863 A | 4/1998 |
| WO | WO-94/15826 A1 | 7/1994 |

* cited by examiner

ROLLER DEVICE FOR TRACK-TYPE WORK VEHICLE

TECHNICAL FIELD

The present invention relates to a roller device for a track-type work vehicle.

BACKGROUND ART

Track-type work vehicles, such as bulldozers, have a crawler type carrier. The crawler type carrier has a crawler belt apparatus, a sprocket wheel, an idler tumbler, a roller device, and the like. The crawler belt apparatus is generally structured by coupling a plurality of crawler belt links endlessly with pins and bushings and attaching a track shoe plate to the plurality of crawler belt links. The crawler belt apparatus is wound around the sprocket wheel, the idler tumbler and the roller device, and is configured to be rotationally driven with a rotation of the sprocket wheel by engaging the tooth of the sprocket wheel with the above-mentioned bushings.

The roller device has a shaft, a seal, a roller shell, and the like. The shaft is fixed to a vehicle. The shaft has a storage for lubricating oil, and is provided with the seal for sealing the device such that lubricating oil does not leak out. The roller shell is rotatably supported by the shaft. The above-mentioned lubricating oil is supplied to the rotating section of the roller shell and the shaft. The roller shell is worn by rolling over rail surfaces of the crawler belt links during traveling. As the wear of the roller shell progresses, the roller shell needs to be replaced. When replacing the roller shell, there is a technique for replacing the whole roller device. However, this technique is costly. Therefore, a technique for replacing the roller shell alone rather than the whole roller device has been proposed. This technique for replacing the roller shell alone rather than the whole roller device is disclosed in, for example, Japanese Patent Laying-Open No. 50-90026 (PTD 1).

CITATION LIST

Patent Document

PTD 1: Japanese Patent Laying-Open No. 50-90026

SUMMARY OF INVENTION

Technical Problem

In the roller device described in the above-mentioned publication, the seal is disassembled and detached from the shaft when replacing the roller shell. Thus, the lubricating oil leaks out disadvantageously.

The present invention was made in view of the above problems, and has an object to provide a roller device that allows a roller shell to be replaced without leakage of lubricating oil.

Solution To Problem

A roller device for a track-type work vehicle of the present invention includes a shaft, a bushing, a roller shell, a retainer, and a seal. The shaft has a rotation axis. The bushing is fitted over an outer circumference of the shaft to be rotatable relative to the shaft around the rotation axis. The roller shell has a cylindrical shape and is fitted over the outer circumference of the bushing. The retainer is formed annularly, is fixed detachably to an end of the bushing, and is fitted in an end of the roller shell on a radially outer side. The seal is disposed on the outer circumference of the shaft so as to seal a gap between the shaft and the bushing. The seal includes a first seal member attached to the bushing and a second seal member attached to the shaft. The first seal member is rotatable relative to the second seal member. The second seal member has an outer circumferential end disposed on an inner side with respect to an inner circumferential end of the retainer.

According to the roller device of the present invention, the outer circumferential end of the second seal member is disposed on the inner side with respect to the inner circumferential end of the retainer. Thus, the seal does not interfere with the retainer when detaching the retainer from the bushing. Also when detaching the roller shell from the bushing, the seal does not interfere with the roller shell. This makes it unnecessary to detach the seal from the shaft when detaching the roller shell from the bushing. Therefore, lubricating oil does not leak out because the seal is not disassembled and detached from the shaft. Hence, the roller shell can be replaced without leakage of lubricating oil.

In the above-described roller device, the seal has an outer diameter smaller than the inner diameter of the innermost circumferential part of the retainer. Thus, the seal does not interfere with the retainer. This can prevent the seal from interfering with the retainer more reliably.

In the above-described roller device, the first seal member is press-fitted in the inner circumference of the bushing, and the second seal member is press-fitted over the outer circumference of the shaft. Accordingly, the seal can be disposed on the inner side of the roller device in the direction of the rotation axis with respect to the retainer. Thus, the retainer can be detached from the bushing without detaching the seal from the roller device.

In the above-described roller device, the retainer abuts on an end face of the first seal member in the direction of the rotation axis of the shaft. Accordingly, the retainer can support the first seal member. Therefore, the seal can be supported by the retainer.

The above-described roller device further includes an elastic member sandwiched between the roller shell and the retainer and fixing the roller shell to the bushing by elastic deformation. Accordingly, the roller shell can be easily detached from the bushing by detaching the retainer from the bushing. That is, the roller shell can be easily replaced.

Advantageous Effects Of Invention

As describe above, according to the present invention, the roller shell can be replaced without leakage of lubricating oil.

DESCRIPTION OF EMBODIMENTS

Hereinafter, one embodiment of the present invention will be described based on the drawings.

First, a configuration of a bulldozer according to the one embodiment of the present invention will be described. Although the bulldozer as an example of a track-type work vehicle to which the idea of the present invention is applicable will be described below, the present invention is also applicable to a track-type work vehicle such as a hydraulic excavator.

Figure 1:
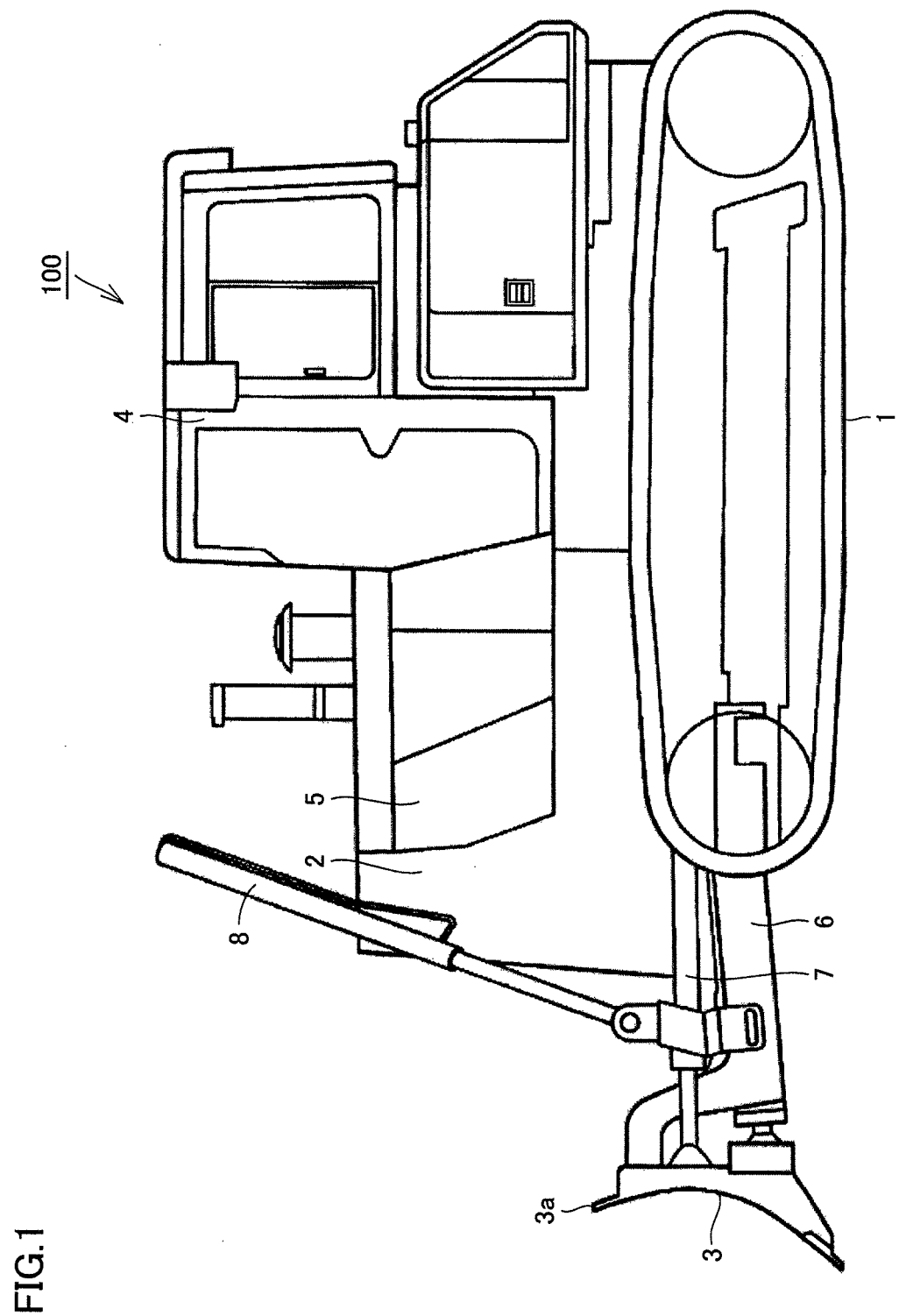
FIG. 1 is a schematic side view showing a configuration of a bulldozer as an example of a track-type work vehicle according to one embodiment of the present invention.

Referring to FIG. 1, a bulldozer 100 of an embodiment of the present invention mainly includes a matched pair of traveling apparatuses including crawler type carriers 1 and separated from each other in the width direction, a body 2 disposed between the matched pair of traveling apparatuses, and a blade 3 disposed at a front position of body 2. Body 2 has a cab (operator's cab) 4 and an engine compartment 5. Cab 4 occupies the upper backside portion of body 2, and engine compartment 5 is disposed in front of cab 4.

Blade 3 has left and right sides supported by frames 6, and is provided to be operated by angling cylinders 7 and lift cylinders 8. Frame 6 has one end attached to the backside surface of blade 3 by a rotatable support, and has the other end pivotably supported by a side surface of body 2. Each of angling cylinders 7 has one end pivotably supported by the backside surface of blade 3, and has the other end pivotably supported by the upper surface of frame 6. This angling cylinder 7 is extended and contracted by hydraulic pressure to move an upper end 3a on the right or left end in the fore/aft direction (leftward/rightward in FIG. 1) relative to a support formed by frame 6 of blade 3, thereby controlling a posture of blade 3 in the fore/aft direction. Each of lift cylinders 8 has one end pivotably supported by the backside surface of blade 3, and has an intermediate portion pivotably supported by a side surface of body 2. This lift cylinder 8 is extended or contracted by hydraulic pressure to move blade 3 in the upward/downward direction relative to the other end of frame 6.

Figure 2:
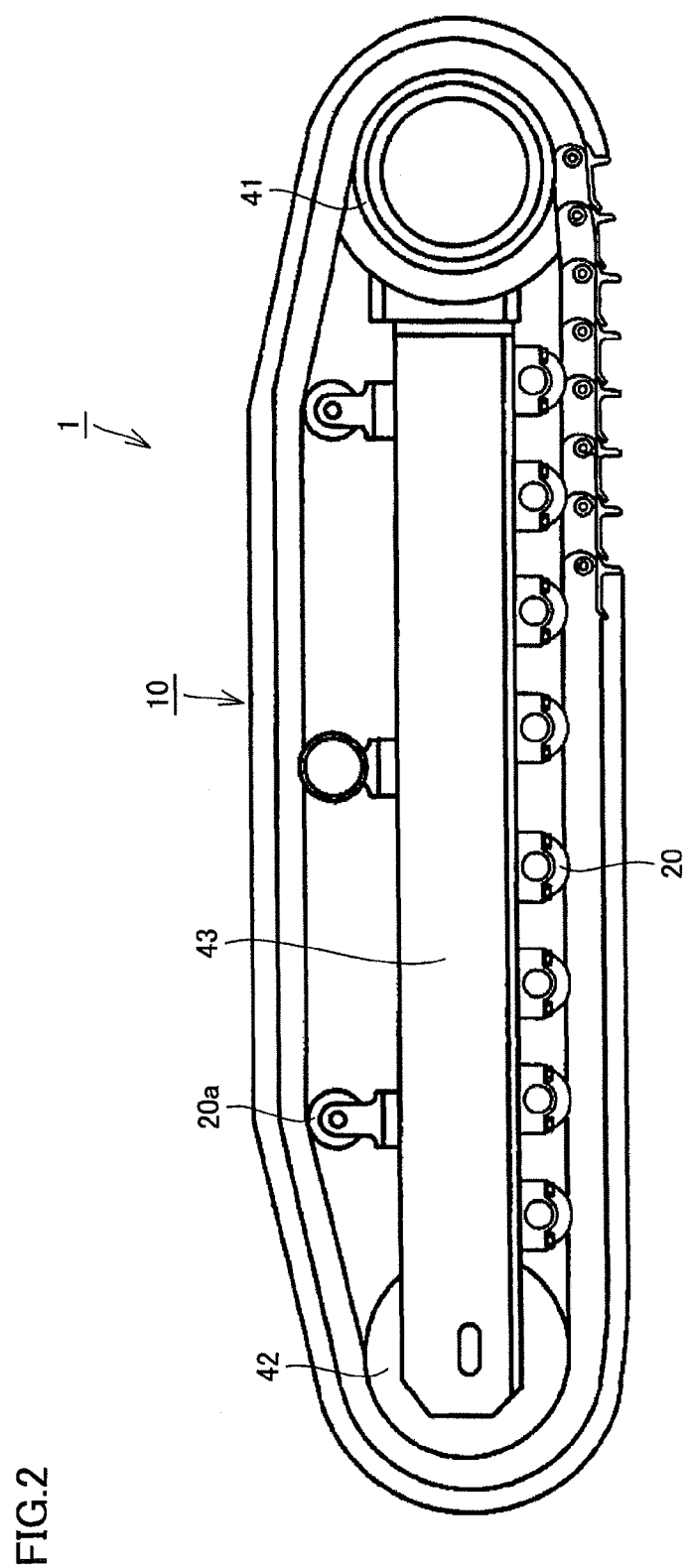
FIG. 2 is a side view schematically showing a configuration of a crawler type carrier in the track-type work vehicle in FIG. 1.

Referring to FIG. 2, crawler type carrier 1 mainly includes a crawler belt apparatus 10, a roller device (track roller) 20, a carrier roller 20a, a driving wheel (sprocket wheel) 41, an idler wheel (idler tumbler) 42, and a track frame 43.

Body 2 is provided on each side thereof with driving wheel 41 and track frame 43. Track frame 43 is provided on each side thereof with idler wheel 42, a plurality of roller devices (track rollers) 20, and a plurality of carrier rollers 20a. Driving wheel 41 is provided at the rear end of body 2 such that it can be driven to rotate. Idler wheel 42 is rotatably provided, for example, at the front end of track frame 43. The plurality of roller devices (track rollers) 20 are rotatably provided on the lower side of track frame 43. The plurality of carrier rollers 20a are rotatably provided on the upper side of track frame 43.

Crawler belt apparatus 10 is configured in an endless manner (in an oval shape), and wound around driving wheel 41 and idler wheel 42. Furthermore, crawler belt apparatus 10 is supported by plurality of roller devices (track rollers) 20 and plurality of carrier rollers 20a that are arranged between driving wheel 41 and idler wheel 42.

Crawler belt apparatus 10 is engaged with driving wheel 41, and configured such that it can be driven to rotate with a rotation of this driving wheel 41. During driving rotation of crawler belt apparatus 10, each of idler wheel 42, plurality of roller devices (track rollers) 20 and plurality of carrier rollers 20a can be driven to rotate while coming into contact with crawler belt apparatus 10.

Figure 3:
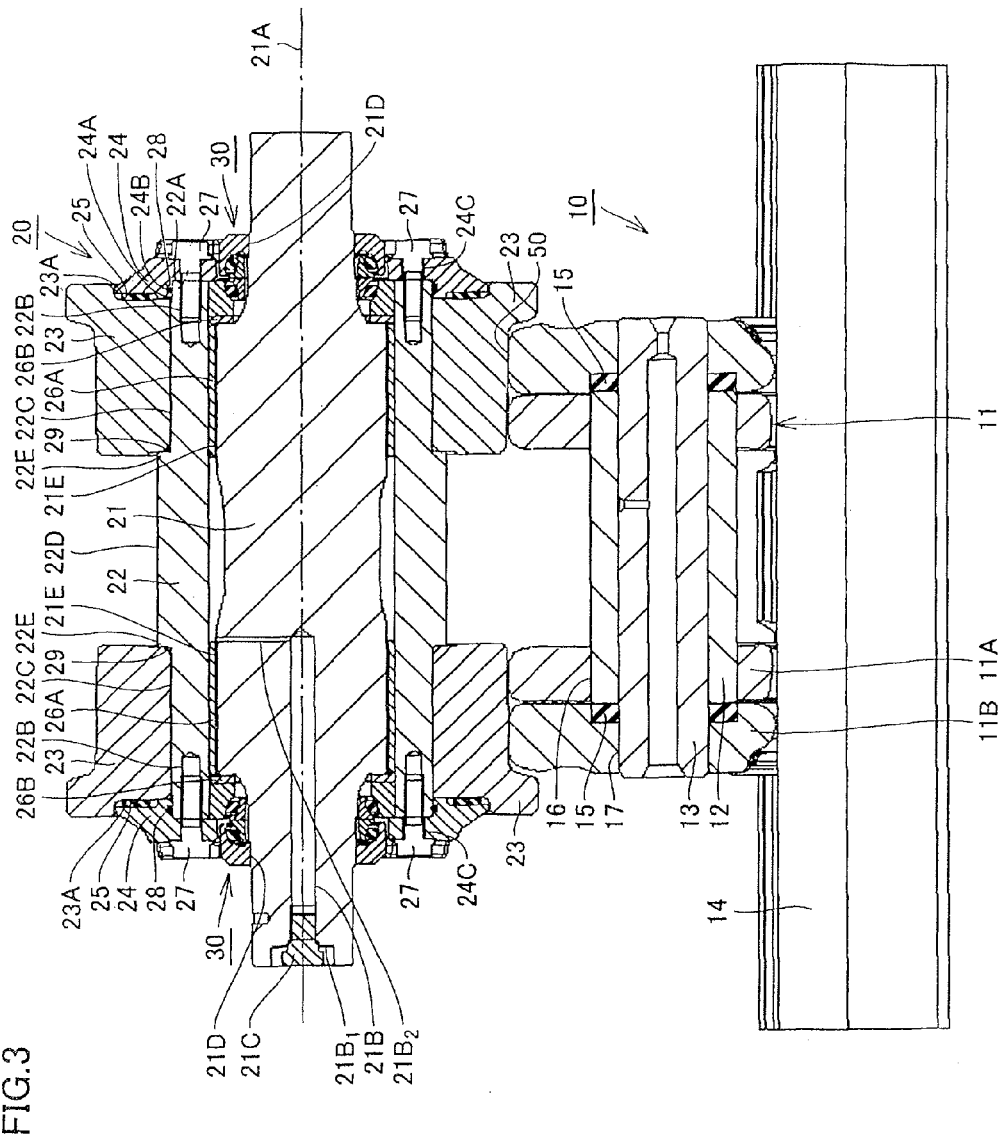
FIG. 3 is a cross-sectional view schematically showing a state in which a roller device abuts on a crawler belt apparatus included in the crawler type carrier in FIG. 2.

Referring to FIG. 3, crawler belt apparatus 10 described above mainly includes a crawler belt link 11, a bushing 12, a coupling pin 13, a track shoe plate (shoe plate) 14, and a seal member 15. Crawler belt apparatus 10 is configured in an oval shape by coupling, in an endless manner, a plurality of crawler belt links 11 having track shoe plate 14 attached thereto.

In one crawler belt apparatus 10, a plurality of crawler belt links 11 are arranged in two rows. One crawler belt link 11 and the other crawler belt link 11 located adjacent to each other in the same row are arranged so as to allow communication between bushing hole 16 of one crawler belt link 11 and pin hole 17 of the other crawler belt link 11.

Cylindrical bushing 12 is pressed-fitted into bushing hole 16 of one crawler belt link 11. Coupling pin 13 is inserted into bushing 12, and pressed-fitted into pin hole 17 of the other crawler belt link 11. Seal member 15 is inserted into a larger-diameter part of pin hole 17 of the other crawler belt link 11. One crawler belt link 11 and the other crawler belt link 11 arranged in the row direction are coupled to each other in this way.

Furthermore, crawler belt link 11 in the first row is placed on one end side of one bushing 12 and coupling pin 13 as described above while crawler belt link 11 in the second row is placed on the other end side thereof, so that crawler belt links 11 in one row and the other row are coupled to each other. In this state, one end 11A of one crawler belt link 11 is placed on the inner side of the two rows of crawler belt links 11, and the other end 11B of the other crawler belt link 11 is placed on the outer side of the two rows of crawler belt links 11.

In this way, crawler belt links 11 in each row are coupled to each other. With the first row of crawler belt links 11 disposed on the one end side of one bushing 12 and coupling pin 13 and the second row of crawler belt links 11 disposed on the other end side, plurality of crawler belt links 11 constituting the two rows are coupled to each other.

Roller device (track roller) 20 described above is placed to be capable of rolling with roller shell 23 abutting on rail surfaces 50 of crawler belt links 11. Hereinafter, a configuration of roller device (track roller) 20 will be described in detail.

Roller device (track roller) 20 has a shaft 21, a bushing 22, roller shell 23, a retainer 24, an elastic member 25, a bearing 26A, a thrust bearing 26B, a fixing member (bolt) 27, O-rings 28, 29, and a seal 30.

Shaft 21 has rotation axis 21A. Rotation axis 21A extends through the center of shaft 21. Bushing 22 and roller shell 23 rotate around shaft 21 with rotation axis 21A serving as the center of rotation. Shaft 21 has a supply channel 21B for storing and supplying lubricating oil in between shaft 21 and bushing 22. Supply channel 21B is formed along rotation axis 21A, and has an opening $21B_1$ in one end face of shaft 21. Supply channel 21B also has a through-hole $21B_2$ communicating with the outer circumferential surface of shaft 21. Accordingly, the lubricating oil injected through opening $21B_1$ is supplied from supply channel 21B to a gap between shaft 21 and bushing 22 through through-hole $21B_2$.

Shaft 21 further has a plug member 21C which is mountable to opening 21B₁ of supply channel 21B. After the lubricating oil is injected to supply channel 21B through opening 21B₁, plug member 21C is mounted on opening 21B₁. Shaft 21 also has shaft smaller-diameter parts 21D arranged on the both ends and a shaft larger-diameter part 21E arranged closer to the central side than shaft smaller-diameter part 21D. Shaft larger-diameter part 21E has, on its both ends, annular flat outer circumferential surfaces in a plane orthogonal to rotation axis 21A, and shaft smaller-diameter parts 21D are provided via the outer circumferential surfaces. Shaft larger-diameter part 21E is cylindrical on the both ends in the axial direction, and between the cylindrical sections, has a section having a diameter smaller than that of the cylindrical sections.

Bushing 22 is fitted over the outer circumference of shaft 21 so as to be capable of rotating relative to shaft 21 around rotation axis 21A. Bushing 22 has a plurality of attachment holes 22B formed in end face 22A. Bushing 22 also has bushing smaller-diameter parts 22C arranged on the both ends and a bushing larger-diameter part 22D arranged closer to the central side than bushing smaller-diameter parts 22C. A step 22E is formed at the outer circumferential surface of bushing 22 between bushing smaller-diameter parts 22C and bushing larger-diameter part 22D. Step 22E has an annular flat surface orthogonal to rotation axis 21A.

Roller shell 23 has a cylindrical shape, and is fitted over the outer circumference of bushing 22. Specifically, two roller shells 23 are fitted over two bushing smaller-diameter parts 22C, respectively. Roller shell 23 is attached to the outer circumferential surface of bushing 22 so as to be detachable. One end of roller shell 23 abuts on step 22E with roller shell 23 being attached to bushing 22. Roller shell 23 has a recess 23A provided on the other end. Roller shell 23 may be fitted over bushing 22 with a gap left therebetween. A tapering part on which an O-ring 29 which will be described later is to be arranged is provided on the inner circumference of one end of roller shell 23.

Retainers 24 are a pair of flat annular members. Surfaces of pair of retainers 24 opposite to each other are inner circumferential surfaces 24A. Retainer 24 has a groove 24B in inner circumferential surface 24A on the radially inner side of roller device 20. Pair of retainers 24 are fixed detachably to the opposite ends of bushing 22 at grooves 24B. In the state fixed to bushing 22, retainers 24 are respectively opposed to the end faces of bushing 22 in the direction of rotation axis 21A on inner circumferential surfaces 24A excluding grooves 24B. That is, retainers 24 are fixed detachably to the ends of bushing 22, and are fitted in the ends of roller shell 23 on the radially outer side. Retainer 24 has a plurality of insertion holes 24C provided in the circumferential direction.

Elastic member 25 is disposed between roller shell 23 and retainer 24 in a region where roller shell 23 and retainer 24 are opposed to each other in the direction of rotation axis 21A. Specifically, elastic member 25 is sandwiched between roller shell 23 and retainer 24 in recess 23A of roller shell 23. Elastic member 25 has a shape that can abut on both of roller shell 23 and retainer 24.

Elastic member 25 is more likely to be elastically deformed than roller shell 23 and retainer 24. Elastic member 25 has a coefficient of friction higher than those of roller shell 23 and retainer 24. Elastic member 25 is formed from rubber, for example. As the rubber, NR (natural rubber), CR (chloroprene rubber), NBR (acrylonitrile-butadiene rubber), EPT (ethylene-propylene rubber), IIR (isobutylene-isoprene rubber), CSM (chlorosulfonated polyethylene rubber), SBR (styrene-butadiene rubber), BR (butadiene rubber), SR (silicone rubber), FR (fluororubber), UR (urethane rubber), or the like can be used.

Figure 4:
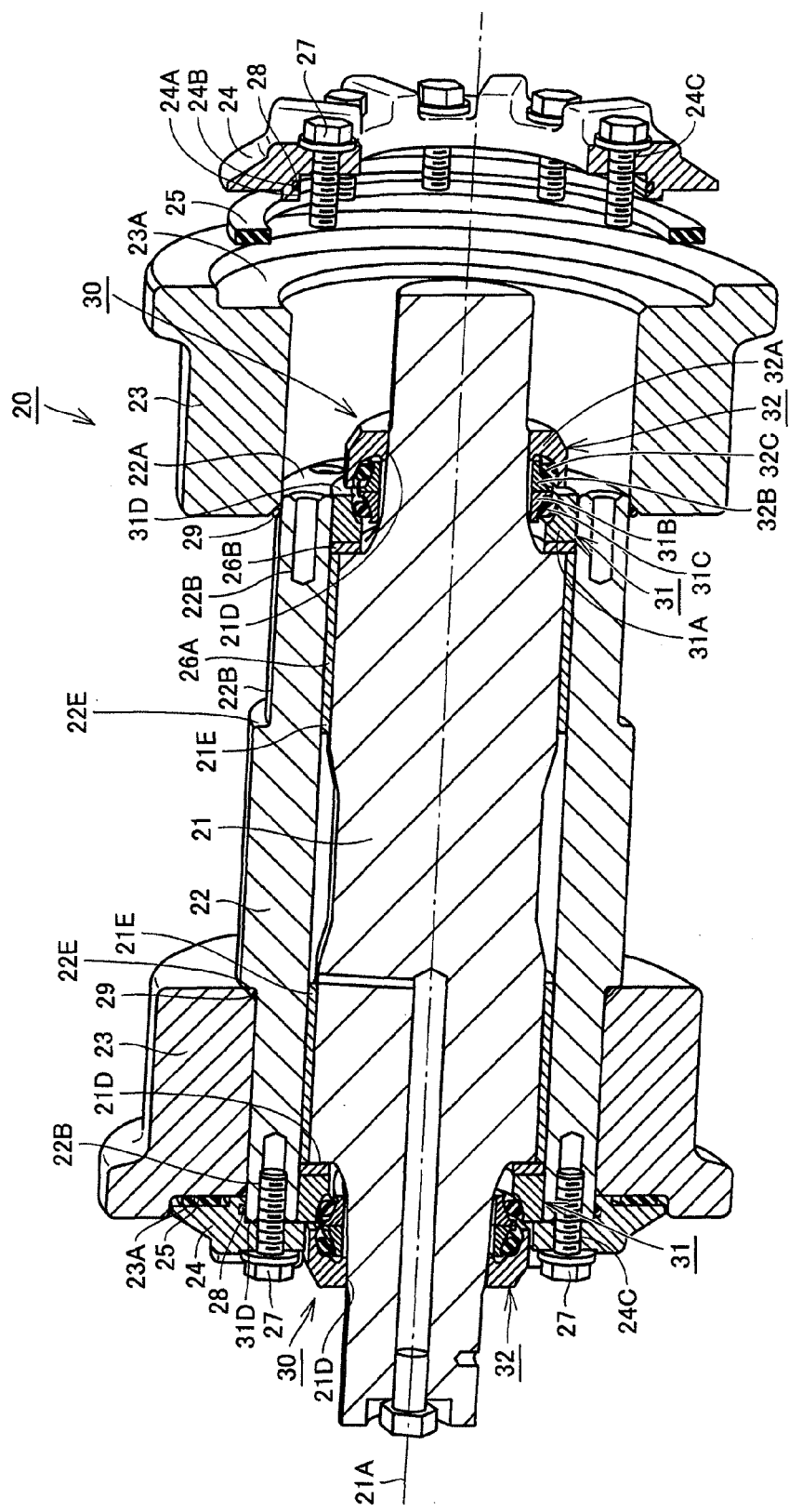
FIG. 4 is a partial exploded perspective cross-sectional view schematically showing a configuration of the roller device in FIG. 3.

Referring to FIGS. 3 and 4, elastic member 25 is formed over the end face of bushing 22 entirely in the circumferential direction. That is, elastic member 25 is formed annularly. Elastic member 25 is formed to have a uniform thickness. Retainer 24 is formed annularly so as to cover elastic member 25.

Bearing 26A is fitted over the outer circumferential surface of shaft 21. Specifically, bearing 26A is arranged between the outer circumferential surface of shaft larger-diameter part 21E and the inner circumferential surface of bushing 22. Thrust bearing 26B is arranged at an end face between shaft smaller-diameter part 21D and shaft larger-diameter part 21E.

Retainer 24 is fixed to bushing 22 by plurality of fixing members (bolts) 27 with elastic member 25 interposed between retainer 24 and roller shell 23. Roller shell 23 is fixed to bushing 22 by causing elastic member 25 to be elastically deformed with the axial force of fixing members 27 so that roller shell 23 is biased in the direction of rotation axis 21A. Fixing member (bolt) 27 is attached to attachment hole 22B of bushing 22 through insertion hole 24C of retainer 24.

O-ring 28 is arranged between the outer circumferential surface of bushing 22 and an inner circumferential surface 24A of retainer 24. Specifically, O-ring 28 is arranged in a groove provided in a surface parallel to rotation axis 21A in a groove 24B formed in inner circumferential surface 24A of retainer 24. O-ring 29 is arranged between step 22E and the tapering part of roller shell 23.

Figure 5:
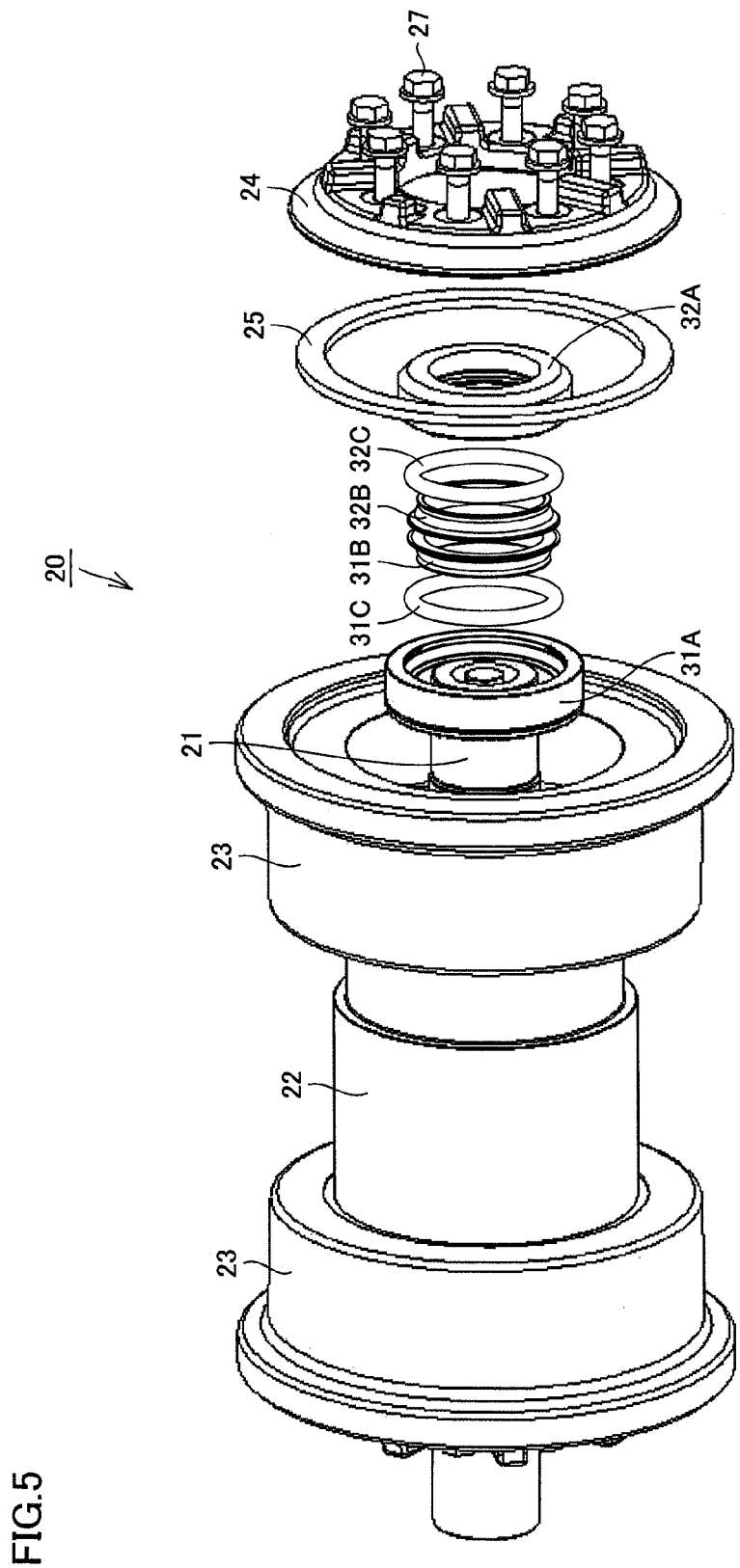
FIG. 5 is a partial exploded perspective view schematically showing a configuration of the roller device in FIG. 4.

Referring to FIGS. 4 and 5, seal 30 is arranged on the inner circumferential side of each of bushing 22 and retainer 24. Seal 30 is a floating seal. Seal 30 has a first seal member 31 on the rotating side and a second seal member 32 on the fixed side. First seal member 31 is attached to bushing 22. Specifically, first seal member 31 is inserted in the inner circumference of bushing 22. Second seal member 32 is configured to be rotatable relative to first seal member 31. Second seal member 32 is attached to shaft 21. Specifically, second seal member 32 is inserted over the outer circumference of shaft 21.

First seal member 31 has a first housing 31A, a first floating seal 31B, and a first elastic ring 31C. First housing 31A is an annular member, and is fixed with its outer circumference fitted on the inner circumference of bushing 22. First floating seal 31B is supported on the inner circumference of first housing 31A with first elastic ring 31C interposed therebetween.

Second seal member 32 has a second housing 32A, a second floating seal 32B, and a second elastic ring 32C. Second housing 32A is an annular member, and is fixed with its inner circumference press-fitted over the outer circumference of shaft 21. Second floating seal 32B is supported on the inner circumference of second housing 32A with second elastic ring 32C interposed therebetween.

First floating seal 31B and second floating seal 32B abut on each other by elastic force of first elastic ring 31C and second elastic ring 32C to be kept in a sealed condition. When first housing 31A on the rotating side is rotated, first floating seal 31B and second floating seal 32B slide in the sealed condition. Accordingly, leakage of the lubricating oil can be prevented.

The outer circumferential end of second seal member 32 is disposed on the inner circumferential side with respect to the inner circumferential end of retainer 24. Specifically, the outer circumferential end of second housing 32A is disposed on the inner circumferential side with respect to the inner circumferential end of retainer 24. That is, the outer circumferential end of second housing 32A is disposed on the rotation axis 21A side with respect to the inner circumferential end of retainer 24.

Seal 30 has an outer diameter smaller than or equal to the inner diameter of the innermost circumferential part of retainer 24. The outer diameter of second housing 32A is smaller than the inner diameter of the innermost circumferential part of retainer 24. Therefore, the outer circumferential end of second housing 32A does not abut on the inner circumferential end of the innermost circumferential part of retainer 24. The outer diameter of second housing 32A is smaller than the outer diameter of the end face of bushing 22 (which is substantially equal to the inner diameter of roller shell 23).

Retainer 24 abuts on an end face 31D of first seal member 31 on the second seal member 32 side in the direction of the rotation axis 21A. Specifically, retainer 24 abuts on end face 31D of first seal member 31 opposed to second seal member 32. Accordingly, first seal member 31 is also fixed by retainer 24 while being fixed by bushing 22.

In roller device 20 of the one embodiment of the present invention, after removing retainer 24 from bushing 22 by unscrewing plurality of fixing members (bolts) 27, roller shell 23 can be detached from bushing 22 by pulling out roller shell 23 from bushing 22.

Next, functions and effects of the one embodiment of the present invention will be described.

According to roller device 20 of the one embodiment of the present invention, seal 30 does not interfere with retainer 24 when detaching retainer 24 from bushing 22 because the outer circumferential end of second seal member 32 is disposed on the inner circumferential side with respect to the inner circumferential end of retainer 24. Also when detaching roller shell 23 from bushing 22, seal 30 does not interfere with roller shell 23. Therefore, it is not necessary to detach seal 30 from shaft 21 when detaching roller shell 23 from bushing 22. Therefore, lubricating oil does not leak out because seal 30 is not disassembled and detached from shaft 21. Roller shell 23 can thereby be replaced without leakage of lubricating oil.

According to roller device 20 of the one embodiment of the present invention, seal 30 does not interfere with retainer 24 in a region opposite to roller shell 23 with respect to retainer 24 in the direction of rotation axis 21A of shaft 21. This can prevent seal 30 from interfering with retainer 24 more reliably.

According to roller device 20 of the one embodiment of the present invention, first seal member 31 can be fixed to bushing 22 by press-fitting, and second seal member 32 can be fixed to shaft 21 by press-fitting.

According to roller device 20 of the one embodiment of the present invention, retainer 24 can support first seal member 31. Therefore, seal 30 can be fixed with retainer 24.

According to roller device 20 of the one embodiment of the present invention, elastic member 25 fixes roller shell 23 to bushing 22 by elastic deformation. Accordingly, by detaching retainer 24 from bushing 22, roller shell 23 can be easily detached from bushing 22. That is, roller shell 23 can be easily replaced.

It should be understood that the embodiment disclosed herein is illustrative and non-restrictive in every respect. The scope of the present invention is defined by the claims not by the description above, and is intended to include any modification within the meaning and scope equivalent to the terms of the claims.

REFERENCE SIGNS LIST 1 crawler type carrier; 2 body; 3 blade; 4 cab; 5 engine compartment; 6 frame; 7 angling cylinder; 8 lift cylinder; 10 crawler belt apparatus; 11 crawler belt link; 12, 22 bushing; 13 coupling pin; 14 track shoe plate; 15 seal member; 16 bushing hole; 17 pin hole; 20 roller device; 20a carrier roller; 21 shaft; 21A rotation axis; 21B supply channel; 21C plug member; 21D shaft smaller-diameter part; 21E shaft larger-diameter part; 22A, 31D end face; 22B attachment hole; 22C bushing smaller-diameter part; 22D bushing larger-diameter part; 22E step; 23 roller shell; 23A recess; 24 retainer; 24A inner circumferential surface; 24B groove; 24C insertion hole; 25 elastic member; 26A bearing; 26B thrust bearing; 27 fixing member; 28, 29 O-ring; 30 seal; 31 first seal member; 31A first housing; 31B first floating seal; 31C first elastic ring; 32 second seal member; 32A second housing; 32B second floating seal; 32C second elastic ring; 41 driving wheel; 42 idler wheel; 43 track frame; 50 rail surface of crawler belt link; 100 bulldozer.

The invention claimed is:

1. A roller device for a track-type work vehicle, comprising:
    a shaft having a rotation axis;
    a bushing fitted over an outer circumference of said shaft to be rotatable relative to said shaft around said rotation axis;
    a roller shell having a cylindrical shape and being fitted over the outer circumference of said bushing;
    a retainer being formed annularly, being fixed detachably to an end of said bushing, and being fitted in an end of said roller shell on a radially outer side; and
    a seal disposed on the outer circumference of said shaft so as to seal a gap between said shaft and said bushing,
    said seal including a first seal member attached to said bushing and a second seal member attached to said shaft, said first seal member being rotatable relative to said second seal member,
    said second seal member having a radially outermost circumferential surface disposed radially inward with respect to a radially innermost circumferential surface of said retainer,
    wherein said retainer abuts directly on an end face of said first seal member in the direction of said rotation axis of said shaft.

2. The roller device for a track-type work vehicle according to claim 1, wherein said second seal member has an outer diameter smaller than an inner diameter of the innermost circumferential part of said retainer.

3. The roller device for a track-type work vehicle according to claim 1, wherein said first seal member is press-fitted in the inner circumference of said bushing, and said second seal member is press-fitted over the outer circumference of said shaft.

4. The roller device for a track-type work vehicle according to claim 1, further comprising an elastic member sandwiched between said roller shell and said retainer and fixing said roller shell to said bushing by elastic deformation.

* * * * *